(12) United States Patent
Wang et al.

(10) Patent No.: US 12,554,161 B1
(45) Date of Patent: Feb. 17, 2026

(54) DISPLAY DEVICE, BACKLIGHT MODULE AND METHOD OF ASSEMBLING DISPLAY DEVICE

(71) Applicant: AmTRAN TECHNOLOGY CO., LTD, New Taipei (TW)

(72) Inventors: Ting-Chuen Wang, New Taipei (TW); Cian-Wun Hong, New Taipei (TW); Chih-Cheng Wu, New Taipei (TW)

(73) Assignee: AmTRAN TECHNOLOGY CO., LTD, New Taipei (TW)

( * ) Notice: Subject to any disclaimer, the term of this patent is extended or adjusted under 35 U.S.C. 154(b) by 0 days.

(21) Appl. No.: 19/096,668

(22) Filed: Mar. 31, 2025

(30) Foreign Application Priority Data

Dec. 4, 2024 (TW) .................................. 113146963

(51) Int. Cl.
*G02F 1/13357* (2006.01)

(52) U.S. Cl.
CPC .. *G02F 1/133606* (2013.01); *G02F 1/133608* (2013.01)

(58) Field of Classification Search
CPC ......... G02F 1/133606; G02F 1/133603; G02F 1/166608; F21V 15/04
See application file for complete search history.

(56) References Cited

U.S. PATENT DOCUMENTS

| | | | | |
|---|---|---|---|---|
| 8,568,014 B2* | 10/2013 | Kim | .................. | G02F 1/133608 362/225 |
| 11,846,405 B1* | 12/2023 | Zhang | ............... | G02F 1/133606 |
| 11,879,633 B1* | 1/2024 | Lo | ..................... | G02F 1/133605 |
| 2002/0044437 A1* | 4/2002 | Lee | ................... | G02F 1/133604 362/581 |
| 2006/0221612 A1* | 10/2006 | Song | ................. | G02F 1/133603 362/346 |
| 2008/0030648 A1* | 2/2008 | Morita | ............. | G02F 1/133611 349/64 |
| 2011/0149598 A1* | 6/2011 | Min | .................. | G02F 1/133608 362/382 |
| 2014/0211123 A1* | 7/2014 | Lee | ................... | G02F 1/133606 349/64 |

(Continued)

FOREIGN PATENT DOCUMENTS

| | | | |
|---|---|---|---|
| CN | 207096646 U | * 3/2018 | |
| CN | 110376791 B | * 12/2021 | ....... G02F 1/133606 |

(Continued)

*Primary Examiner* — Erin Kryukova
(74) *Attorney, Agent, or Firm* — Winston Hsu

(57) ABSTRACT

A display device includes a backlight module and a display panel. The display panel is disposed on the backlight module. The backlight module includes a back plate, a light source board, a plurality of support pins and a diffuser. The light source board is disposed on a surface of the back plate facing the display panel. The plurality of support pins are disposed on the light source board or the back plate. One of the support pins includes a support member and a cushion layer. The cushion layer is made of a soft material and at least covers a top portion of the support member. The diffuser is disposed above the light source board and the back plate at an optical cavity distance. The diffuser abuts against the cushion layer. In an embodiment, a periphery of each of the plurality of support pins may have a plurality of microstructures.

18 Claims, 4 Drawing Sheets

(56) References Cited

U.S. PATENT DOCUMENTS

2023/0324030 A1   10/2023   Chiu

FOREIGN PATENT DOCUMENTS

| CN | 216411813   U  | 4/2022  |
| CN | 117117065   A  | 11/2023 |
| CN | 118938546   A  | 11/2024 |
| WO | 2021/093412 A1 | 5/2021  |

* cited by examiner

DISPLAY DEVICE, BACKLIGHT MODULE AND METHOD OF ASSEMBLING DISPLAY DEVICE

BACKGROUND OF THE INVENTION

1. Field of the Invention

The present invention relates to a display device and a backlight module and, more particularly, to a backlight module capable of avoiding abnormal noise and improving optical performance, a display device equipped with the backlight module, and a method of assembling the display device.

2. Description of the Prior Art

In the design of a direct type backlight module, a plurality of support pins are disposed between the diffuser and the light source to support the diffuser, so as to prevent the diffuser from deforming and affecting the light emitting effect. However, gaps usually exist between the support pins and the diffuser due to manufacturing or assembly tolerance. When the backlight module suffers vibration or collision, the support pins will collide with the diffuser and generate abnormal noise. This issue is especially noticeable when the backlight module is applied in a vehicular display device. Furthermore, the support pins may also easily cause dark shadows on the diffuser which affect the light emitting effect.

SUMMARY OF THE INVENTION

The present invention provides a backlight module capable of avoiding abnormal noise and improving optical performance, a display device equipped with the backlight module, and a method of assembling the display device, so as to solve the aforesaid problems.

According to an embodiment of the present invention, a display device comprises a backlight module and a display panel. The display panel is disposed on the backlight module. The backlight module comprises a back plate, a light source board, a plurality of support pins and a diffuser. The light source board is disposed on a surface of the back plate facing the display panel. The plurality of support pins are disposed on the light source board or the back plate. One of the support pins comprises a support member and a cushion layer. The cushion layer is made of a soft material and at least covers a top of the support member. The diffuser is disposed above the light source board and the back plate at an optical cavity distance. The diffuser abuts against the cushion layer.

In an embodiment, a periphery of the cushion layer has a plurality of microstructures, the microstructures are formed with the cushion layer and the microstructures are apart from the diffuser by a first distance.

In an embodiment, the microstructures are axially arranged into a plurality of rings along a conical inclined surface of the one of the support pins, two adjacent rings are apart from each other by a second distance, and the second distance is approximately equal to a length of one of the microstructures.

In an embodiment, the microstructures are elliptical-shaped, and a ratio of length to width of the microstructures is between 1.1 and 1.2.

In an embodiment, a surface of the support member is light reflective, and the cushion layer is light transmissive.

In an embodiment, the one of the support pins further comprises a fixing member, the fixing member is combined with a bottom of the support member, the fixing member is fixed on the light source board or the back plate, and the cushion layer covers the support member above the fixing member.

According to an embodiment of the present invention, a backlight module comprises a back plate, a light source board, a plurality of support pins and a diffuser. The light source board is disposed on a surface of the back plate. The plurality of support pins are disposed on the light source board or the surface of the back plate. A plurality of microstructures are disposed on one of the support pins around a periphery of the one of the support pins. The diffuser is disposed above the light source board and the back plate at an optical cavity distance. A top of the one of the support pins is made of a soft material, the diffuser abuts against the top of the one of the support pins, and the plurality of microstructures are apart from the top by a first distance.

In an embodiment, the plurality of microstructures are axially arranged into a plurality of rings along a conical inclined surface of the one of the support pins, two adjacent rings are apart from each other by a second distance, and the second distance is approximately equal to a length of one of the plurality of microstructures.

In an embodiment, the one of the support pins comprises a support member and a cushion layer, the cushion layer is made of a soft material and covers the support member.

In an embodiment, the plurality of microstructures are formed with the cushion layer and the diffuser abuts against the cushion layer at the top of the one of the support pins.

In an embodiment, a surface of the support member is light reflective, and the cushion layer is light transmissive.

In an embodiment, the one of the support pins further comprise a fixing member, the fixing member is combined with a bottom of the support member, the fixing member is fixed on the light source board or the back plate, and the cushion layer covers the support member above the fixing member.

In an embodiment, the plurality of microstructures are elliptical-shaped, and a ratio of length to width of the plurality of microstructures is between 1.1 and 1.2.

According to an embodiment of the present invention, a method of assembling a display device comprises: disposing a back plate; disposing a light source board on the back plate, wherein a plurality of support pins are pre-assembled on the back plate or the light source board, top portions of the support pins are made of a soft material, and a plurality of microstructures are disposed on one of the support pins around a periphery of the one of the support pins; and disposing a diffuser above the light source board and the back plate at an optical cavity distance, wherein the diffuser abuts against the top portions of the support pin.

In an embodiment, each of the plurality of support pins comprises a support member and a cushion layer, and the cushion layer is made of a soft material and at least covers a top of the support member.

In an embodiment, each of the plurality of support pins further comprises a fixing member, the fixing member is combined with a bottom of the support member, and the support pin is pre-assembled on the light source board or the back plate by the fixing member through a surface mount technology.

In an embodiment, the plurality of microstructures are axially arranged into a plurality of rings along a conical inclined surface of the one of the support pins, the plurality of microstructures are apart from the diffuser by a first distance, two adjacent rings are apart from each other by a second distance, and the second distance is approximately equal to a length of one of the plurality of microstructures.

In an embodiment, the plurality of microstructures are elliptical-shaped, and a ratio of length to width of the plurality of microstructures is between 1.1 and 1.2.

In an embodiment, a surface of the support member is light reflective, and the cushion layer is light transmissive.

As mentioned in the above, the present invention utilizes the cushion layer to cover the top of the support member to form the support pin, wherein the cushion layer is made of the soft material. When the backlight module suffers vibration or collision, the cushion layer can provide collision cushion between the support pin and the diffuser, thereby avoiding the abnormal noise. Furthermore, the periphery of the support pin (e.g. the periphery of the cushion layer) may have the microstructures. The microstructures can reflect light emitted by the light source board toward the diffuser to reduce dark shadows formed at the positions of the support pins, thereby improving optical performance.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
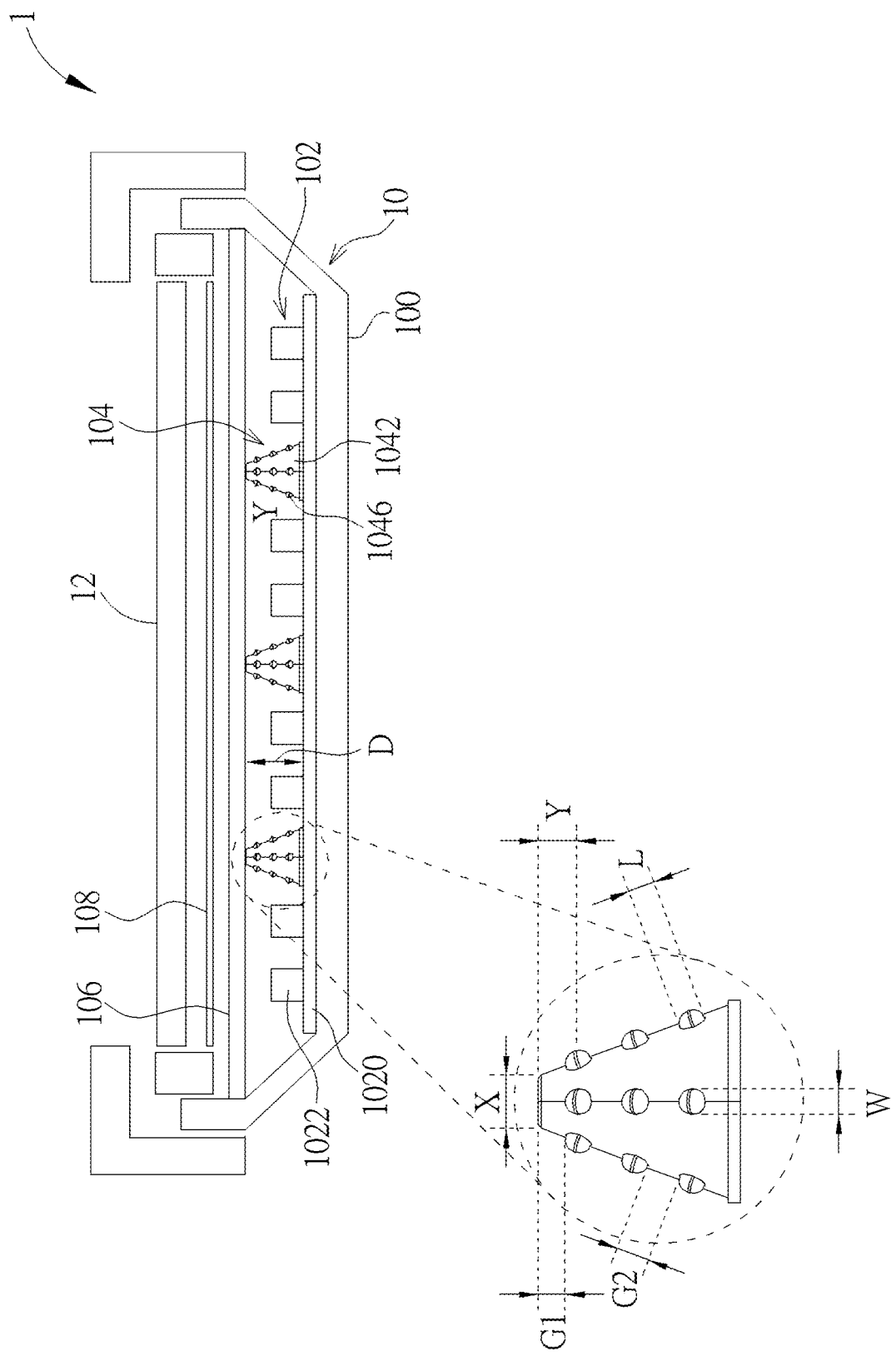
FIG. 1 is a schematic view illustrating a display device according to an embodiment of the present invention.
Figure 2:
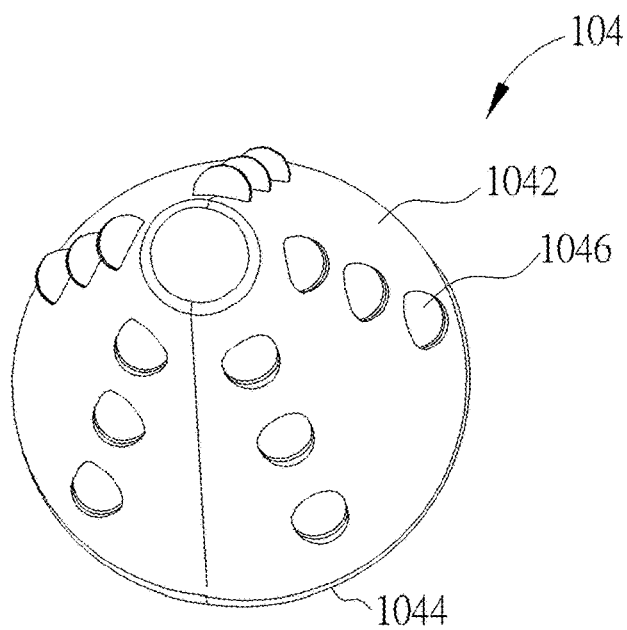
FIG. 2 is a perspective view illustrating a support pin according to an embodiment of the present invention.
Figure 3:
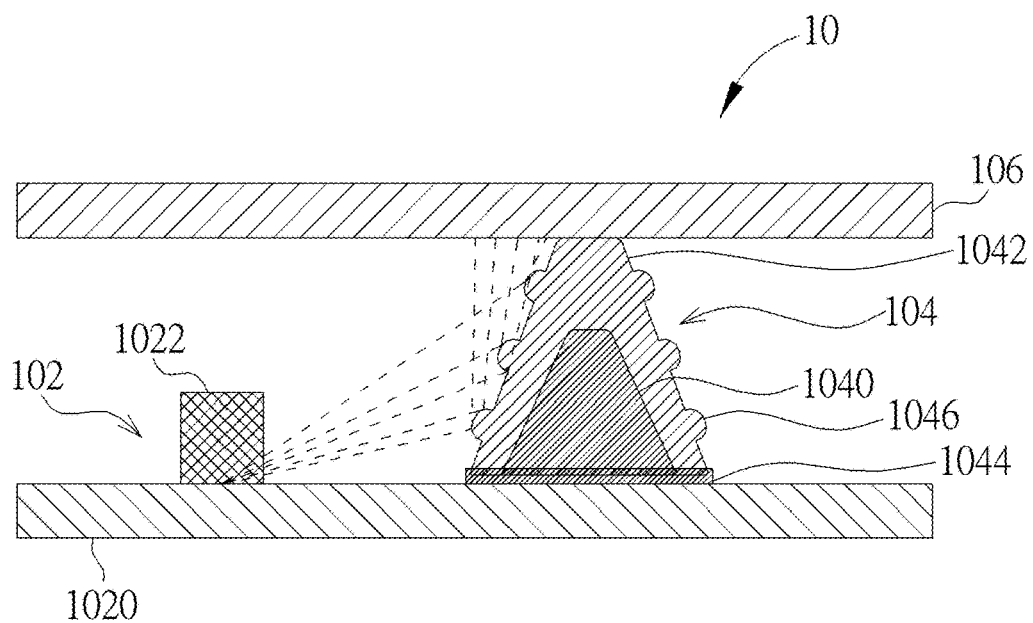
FIG. 3 is a partial sectional view illustrating a backlight module according to an embodiment of the present invention.

Referring to FIGS. 1 to 3, FIG. 1 is a schematic view illustrating a display device 1 according to an embodiment of the present invention, FIG. 2 is a perspective view illustrating a support pin 104 according to an embodiment of the present invention, and FIG. 3 is a partial sectional view illustrating a backlight module 10 according to an embodiment of the present invention.

As shown in FIG. 1, the display device 1 comprises a backlight module 10 and a display panel 12. The display panel 12 is disposed on the backlight module 10. In practical applications, the display panel 12 may be, but is not limited to, a liquid crystal display panel. The display device 1 uses the backlight module 10 to provide light to the display panel for displaying images.

The backlight module 10 comprises a back plate 100, a light source board 102, a plurality of support pins 104, a diffuser 106 and at least one optical film 108. In one embodiment, the backlight module 10 may be, but is not limited to, a direct type backlight module. For example, the light source board 102 may be disposed on a surface of the back plate 100 facing the display panel 12. The light source board 102 may comprise a circuit board 1020 and a plurality of light emitting units 1022, wherein the light emitting units 1022 are disposed on the circuit board 1020. The light emitting unit 1022 may be, but is not limited to, a mini light emitting diode (mini LED). The diffuser 106 is disposed above the light source board 102 and the back plate 100 at an optical cavity distance D, and the at least one optical film 108 is disposed on the diffuser 106. The at least one optical film 108 may comprise a dual brightness enhancement film (DBEF), a prism sheet, a diffusing sheet, or others according to practical application needs. Furthermore, a reflective sheet, a reflective component or a reflective coating layer (not shown in the figures) may be disposed on the circuit board 1020 to reflect light toward the diffuser 106.

In an embodiment of the present invention, the support pins 104 are disposed on the light source board 102 or the back plate 100 to support the diffuser 106 to maintain the distance between the diffuser 106 and the light source board 102 and prevent the diffuser 106 from being partially deformed or tilted. As shown in FIGS. 2 and 3, one of the support pins 104 comprises a support member 1040, a cushion layer 1042 and a fixing member 1044. In an embodiment of the present invention, the support member 1040 is fixed on the fixing member 1044 and the fixing member 1044 is a base of the support pin 1040. The cushion layer 1042 is made of a soft material and at least covers the top portion of the support member 1040. In an embodiment of the present invention, the cushion layer 1042 may be formed through an over molding process on a periphery of the support member 1040 and the cushion layer 1042 may fully cover the support member 1040 above the fixing member 1044. In other words, the top portion of the support pin 104 is made of the soft material. In an embodiment of the present invention, the soft material used to form the cushion layer 1042 may be optical liquid silicone, wherein the transmittance of optical liquid silicone reaches 95% and the hardness reaches 50A. Thus, the cushion layer 1042 is transparent, soft, elastic and light transmissive. In other embodiments, the soft material used to form the cushion layer 1042 may also be rubber or other soft materials based on the design requirements of the backlight module 10, such that the cushion layer 1042 can be soft enough to absorb vibrations and has the optical properties required for practical applications. In an embodiment of present the invention, the support member 1040 may be made of a hard material, e.g. polycarbonate (PC), polyphthalamide (PPA), or others, to maintain structural integrity and avoid lateral deformation caused by instantaneous collision. In addition, the surface of the support member 1040 may be light reflective. In an embodiment of the present invention, the fixing member 1044 may be combined with a bottom of the support member 1040 through an insert molding process. The fixing member 1044 may be made of a metal material and the fixing member 1044 may be fixed on the light source board 102 or the back plate 100. Thus, the support pins 104 may be pre-assembled on the back plate 100 or the light source board 102 by the fixing member 1044 through a surface mount technology (SMT) to ensure stability and prevent detachment. However, the present invention is not limited thereto. The fixing member 1044 of each support pin 104 may also be adhered to the light source board 102 or the back plate 100, fixed with screws from the outside of the back plate 100, or clamped by a reflective sheet and the back plate 100. Furthermore, a combination of two or more of the aforesaid fixing manners may be applied to fix the support pin 104 to ensure the support pin 104 will not loose.

As shown in FIG. 3, since the cushion layer 1042 covers the top portion of the support member 1040, the diffuser 106 abuts against the cushion layer 1042 positioned atop the support pin 104, i.e. the diffuser 106 is in direct contact with the uppermost section of the support pin 104. When the backlight module 10 suffers vibration or collision, the cushion layer 1042 functions as a buffer between the support pin 104 and the diffuser 106 to absorb the collision force, thereby avoiding the abnormal noise. In an embodiment of the present invention, the width X (as shown in FIG. 1) of the top portion of the support pins 104 may be smaller than or equal to 1 mm, which can minimizes the light obstruction caused by the contact between the support pin 104 and the diffusion plate 106, thereby preventing dark shadows formed on the display screen.

As shown in FIGS. 2 and 3, in an embodiment of the present invention, a plurality of microstructures 1046, e.g. micro-lenses, may be disposed around any of the support pins 104. In an embodiment of the present invention, the cushion layer 1042 may have the plurality of microstructures 1046 around the periphery of the support pin 104, wherein the microstructures 1046 may be formed with the cushion layer 1042 using same material, and the microstructures 1046 are apart from the top portion of the support pin 104 or the diffuser 106 by a first distance G1. The microstructures 1046 are configured to reflect light emitted by the light source board 102 toward the diffuser 106, thereby reducing dark shadows formed at the positions where the support pins 104 contact the diffuser 106. This improves the optical performance of the backlight module 10. In an embodiment of the present invention, the shapes of the microstructures 1046 may be elliptical, as shown in FIG. 1. The Length-To-Width ratio (L/W) of the microstructures 1046 may be between 1.1 and 1.2. The microstructures 1046 may be axially arranged in rings around a conical inclined surface of the support pin 104. In addition, the elliptical-shaped microstructures 1046 protrude from the surface of the support pin 104, with the height of the microstructure 1046 perpendicular to the inclined surface being approximately half of the width. That is to say, the Width-to-Height ratio of the microstructure 1046 is approximately 2, which can achieve better optical performance. In FIG. 1, L represents the length of the microstructure 1046 along the conical inclined surface of the support pin 104, and W represents the width of the microstructure 1046. In an embodiment of the present invention, the length L of the microstructure 1046 may be between 0.55 mm and 0.6 mm, and the width W may be 0.5 mm. Furthermore, the vertical distance Y (as shown in FIG. 1) between the center of the uppermost microstructure 1046 and the top portion of the support pin 104 may be 0.8 mm. This positioning can prevent the microstructure 1046 from being too close to or far away from the diffuser 106 and achieve better optical performance. Still further, in an embodiment of the present invention, as shown in FIG. 2, the support pin 104 has five rows of microstructures 1046. A row of the microstructures 1046 are aligned from top to bottom along the conical inclined surface of the support pin 104, and there are equal spaces between adjacent microstructures 1046 in up, down, left, and right directions. That is to say, the microstructures 1046 are evenly arranged in five divisions on the conical inclined surface of the support pin 104. However, the present invention is not limited to only such configuration. The shape, quantity and arrangement of the microstructures 1046 may be modified according to the practical requirements of optical performance, and the present invention is not limited to the embodiments shown in the figures. For example, the microstructures 1046 may be arranged in a staggered alignment or not evenly spaced on the conical inclined surface of the support pin 104. The shape and size of the microstructures 1046 may also be changed according to the light distribution pattern of the light emitting unit 1022.

Figure 4:
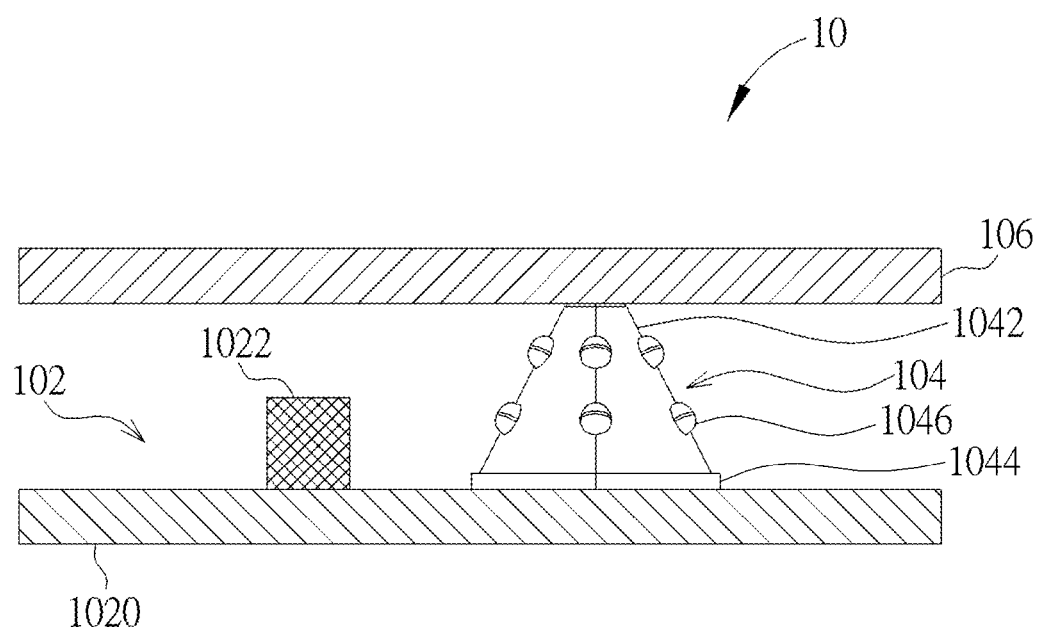
FIG. 4 is another partial sectional view illustrating the backlight module according to an embodiment of the present invention.
Figure 5:
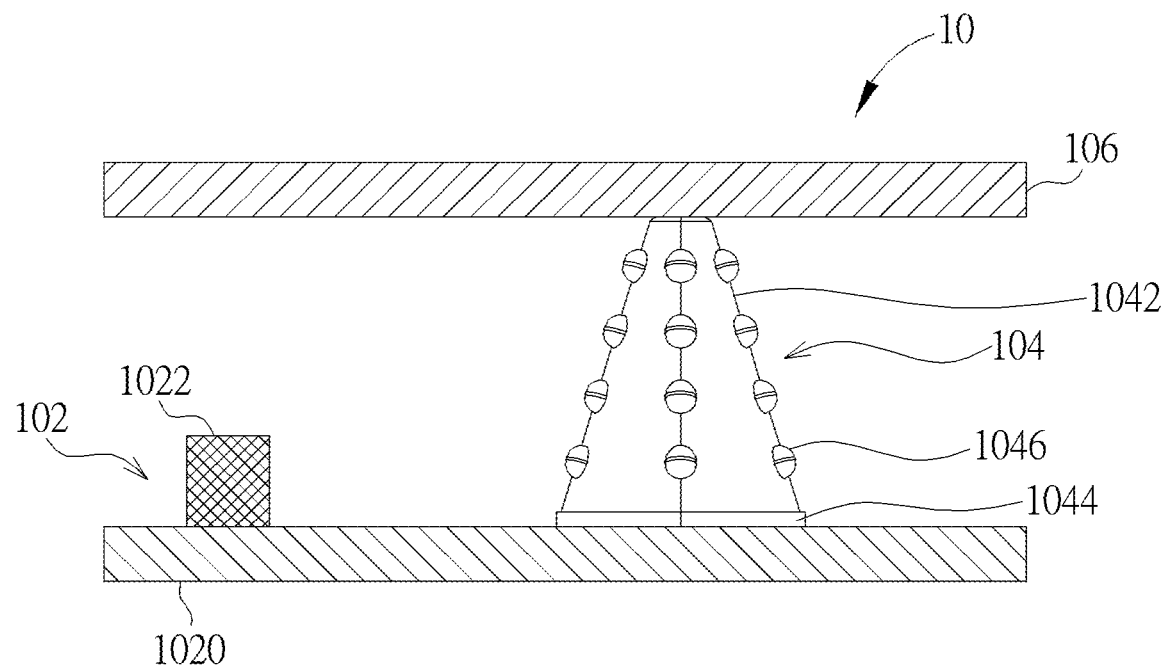
FIG. 5 is another partial sectional view illustrating the backlight module according to an embodiment of the present invention.

Referring to FIGS. 4 and 5, FIG. 4 is another partial sectional view illustrating the backlight module 10 according to an embodiment of the present invention, and FIG. 5 is another partial sectional view illustrating the backlight module 10 according to an embodiment of the present invention.

Referring to table 1 along with FIG. 4, the lower the height of the optical cavity is, the shorter the length of the support pin 104 in the optical cavity is, the less the quantity of microstructures 1046 on the support pin 104 is, and the closer the distance between the support pin 104 and the adjacent light emitting unit 1022 is. On the other hand, as shown in FIG. 4, the longer the length of the support pin 104 in the optical cavity is, the more the quantity of microstructures 1046 on the support pin 104 is, and the farther the distance between the support pin 104 and the adjacent light emitting unit 1022 is. Furthermore, in an embodiment of the present invention, microstructures 1046 of the same row are arranged at equal intervals on the cushion layer 1042 along the conical inclined surface of the support pin 104. According to the height of the optical cavity and the length of the support pin 104, the number of microstructures 1046 in a single row may be slightly adjusted. Taking table 1 below as an example, in the case of five rows of microstructures 1046 on the support pin 104, a single row may have 2 to 4 microstructures 1046. In an embodiment of the present invention, the number of microstructures 1046 in a single row is also the number of columns of microstructures 1046 formed on the surface of the support pin 104. As shown in FIG. 2, the number of microstructures 1046 in a single row is 3, which means that there are three columns of microstructures 1046 arranged evenly around the support pin 104. In an embodiment of the present invention, the distance between the centers of two adjacent microstructures 1046 in the same row is approximately equal to or slightly larger than twice the length of the microstructure 1046. That is to say, the gap between the edges of two adjacent microstructures 1046 in the same row is approximately equal to the length of one microstructure 1046. For example, as shown in table 1 below, the distance between the centers of two adjacent microstructures 1046 in the same row is approximately between 1.1 mm and 1.2 mm. That is to say, among the plurality of rings formed by the microstructures 1046, the distance between two adjacent rings is approximately equal to the length L of one microstructure 1046, i.e. a second distance G2 is between two adjacent rings, and the second distance G2 is approximately equal to the length L of one of the microstructures 1046. However, the present invention is not limited thereto. The length of the support pin 104, the number of the microstructures 1046, and/or the distance between the support pin 104 and the adjacent light emitting unit 1022 can be adjusted according to the practical required optical performance.

TABLE 1

| Height of optical cavity | 3 mm | 4 mm | 5 mm |
|---|---|---|---|
| Distance between centers of two adjacent microstructures in the same row | 1.2 mm | 1.2 mm | 1.1 mm |
| Total microstructures (5 rows) | 10 | 15 | 20 |

In an embodiment of the present invention, the fixing member 1044 is firstly integrated with the bottom of the support member 1040 through an insert molding process. Next, the cushion layer 1042 is formed to cover the periphery of the support member 1040 above the fixing member 1044 through an over molding process. At the same time, a plurality of microstructures 1046 are formed with the cushion layer 1042 through a mold, and the production of the support pin 104 is completed. In an embodiment of the present invention, during the manufacturing of the back plate 100 or the light source board, the support pin 104 may be pre-assembled onto the back plate 100 or the light source board 102 by using surface mount technology to mount the fixing member 1044 of the support pin 104. Accordingly, when assembling the backlight module 10 of the display device 1, it only needs to dispose the back plate 100, the light source board 102 and the diffuser 106 in sequence, and the time for assembling the support pins 104 can be saved. For example, the light source board 102 may have through holes corresponding to the pre-assembled support pins 104 on the back plate 100, which can be directly installed on the back plate 100 and the support pins 104 pass through the light source board 102, or the light source board 102, having the support pins 104 pre-assembled, may be directly assembled on the back plate 100. Then, the diffuser 106 may be disposed on the top portion of the support pin 104, thereby completing the assembly of the backlight module 10.

Figure 6:
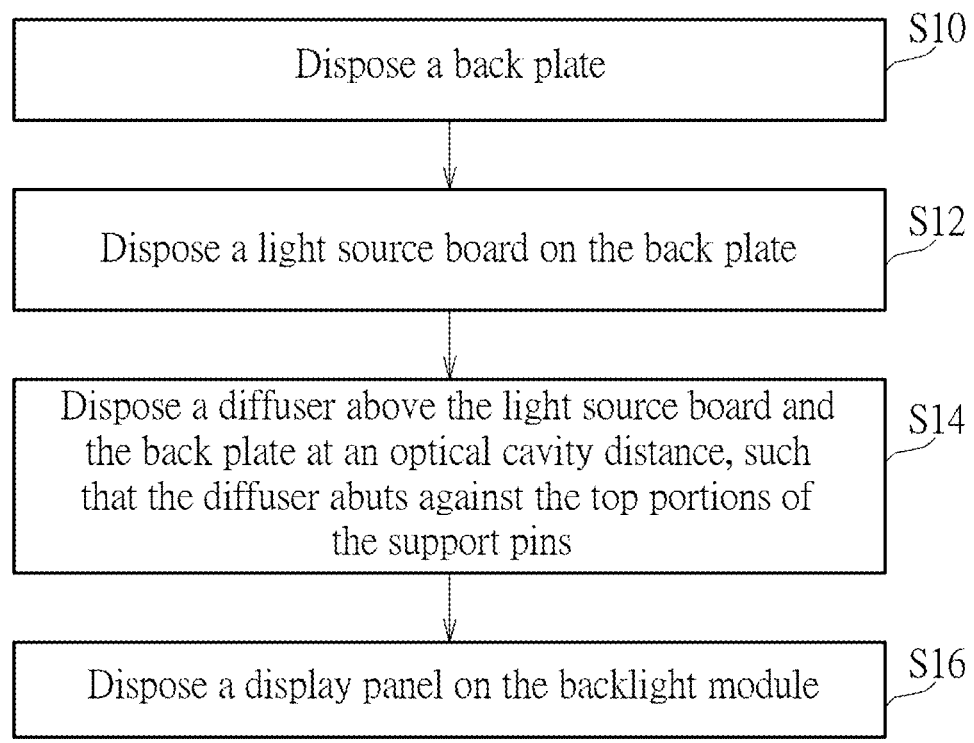
FIG. 6 is a flowchart illustrating a method of assembling the display device according to an embodiment of the present invention.

Referring to FIG. 6, FIG. 6 is a flowchart illustrating a method of assembling the display device 1 according to an embodiment of the present invention.

As shown in FIGS. 1 and 6, the method of assembling the display device 1 may comprise the following steps. First, at step S10, a back plate 100 is disposed that a surface of the back plate 100 is facing upwardly. Then, at step S12, a light source board 102 is disposed on the surface of the back plate 100, wherein a plurality of support pins 104 are pre-assembled on the light source board 102 or the surface of the back plate 100 before the assembly of the display device 1. The top portions of the support pins 104 are made of a soft material, and a plurality of microstructures 1046 are disposed on the support pins 104 around a periphery of the support pins 104. Then, at step S14, a diffuser 106 is disposed above the light source board 102 and the back plate 100 at an optical cavity distance D. The diffuser 106 abuts against the top portions of the support pins 104. Then, at step S16, a display panel 12 is disposed on the backlight module 10. It should be noted that the detailed embodiments of the backlight module 10 of the present invention are mentioned in the above and those will not be depicted herein again.

As mentioned in the above, the present invention utilizes the cushion layer to cover the top portion of the support member to form the support pin, wherein the cushion layer is made of the soft material. When the backlight module suffers vibration or collision, the cushion layer can provide collision cushion between the support pin and the diffuser, thereby avoiding the abnormal noise. Furthermore, the periphery of the support pin (e.g. the periphery of the cushion layer) may have the microstructures. The microstructures can reflect light emitted by the light source board toward the diffuser to reduce dark shadows formed at the positions of the support pins, thereby improving optical performance.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display device comprising:
a display panel; and
a backlight module, the display panel being disposed on the backlight module, the backlight module comprising:
a back plate;
a light source board disposed on a surface of the back plate facing the display panel;
a plurality of support pins disposed on the light source board or the back plate, one of the support pins comprising a support member and a cushion layer, the cushion layer being made of a soft material and at least covering a top portion of the support member, a periphery of the cushion layer having a plurality of microstructures, the microstructures being axially arranged into a plurality of rings along a conical inclined surface of the one of the support pins; and
a diffuser disposed above the light source board and the back plate at an optical cavity distance, the diffuser abutting against the cushion layer.

2. The display device of claim 1, wherein the microstructures are formed with the cushion layer and the microstructures are apart from the diffuser by a first distance.

3. The display device of claim 2, wherein two adjacent rings are apart from each other by a second distance, and the second distance is approximately equal to a length of one of the microstructures.

4. The display device of claim 2, wherein the microstructures are elliptical-shaped, and a ratio of length to width of the microstructures is between 1.1 and 1.2.

5. The display device of claim 1, wherein a surface of the support member is light reflective, and the cushion layer is light transmissive.

6. The display device of claim 1, wherein the one of the support pins further comprises a fixing member, the fixing member is combined with a bottom of the support member, the fixing member is fixed on the light source board or the back plate, and the cushion layer covers the support member above the fixing member.

7. A backlight module comprising:
a back plate;
a light source board disposed on a surface of the back plate;
a plurality of support pins disposed on the light source board or the surface of the back plate, wherein a plurality of microstructures are disposed on one of the support pins around a periphery of the one of the support pins and the plurality of microstructures are elliptical-shaped; and
a diffuser disposed above the light source board and the back plate at an optical cavity distance;
wherein a top portion of the one of the support pins is made of a soft material, the diffuser abuts against the top portion of the one of the support pins, and the plurality of microstructures are apart from the top portion by a first distance.

8. The backlight module of claim 7, wherein the plurality of microstructures are axially arranged into a plurality of rings along a conical inclined surface of the one of the support pins, two adjacent rings are apart from each other by a second distance, and the second distance is approximately equal to a length of one of the plurality of microstructures.

9. The backlight module of claim 7, wherein the one of the support pins comprises a support member and a cushion layer, the cushion layer is made of a soft material and covers the support member.

10. The backlight module of claim 9, wherein the plurality of microstructures are formed with the cushion layer and the diffuser abuts against the cushion layer at the top portion of the one of the support pins.

11. The backlight module of claim 9, wherein a surface of the support member is light reflective, and the cushion layer is light transmissive.

12. The backlight module of claim 9, wherein the one of the support pins further comprise a fixing member, the fixing member is combined with a bottom of the support member, the fixing member is fixed on the light source board or the back plate, and the cushion layer covers the support member above the fixing member.

13. The backlight module of claim 7, wherein a ratio of length to width of the plurality of microstructures is between 1.1 and 1.2.

14. A method of assembling a display device comprising:
disposing a back plate;
disposing a light source board on the back plate, wherein a plurality of support pins are pre-assembled on the back plate or the light source board, top portions of the support pins are made of a soft material, and a plurality of microstructures are disposed on one of the support pins around a periphery of the one of the support pins; and
disposing a diffuser above the light source board and the back plate at an optical cavity distance, wherein the diffuser abuts against the top portions of the support pins;
wherein the plurality of microstructures are axially arranged into a plurality of rings along a conical inclined surface of the one of the support pins, the plurality of microstructures are apart from the diffuser by a first distance, two adjacent rings are apart from each other by a second distance, and the second distance is approximately equal to a length of one of the plurality of microstructures.

15. The method of assembling the display device of claim 14, wherein each of the plurality of support pins comprises a support member and a cushion layer, and the cushion layer is made of a soft material and at least covers a top portion of the support member.

16. The method of assembling the display device of claim 15, wherein each of the plurality of support pins further comprises a fixing member, the fixing member is combined with a bottom of the support member, and the support pin is pre-assembled on the light source board or the back plate by the fixing member through a surface mount technology.

17. The method of assembling the display device of claim 14, wherein the plurality of microstructures are elliptical-shaped, and a ratio of length to width of the plurality of microstructures is between 1.1 and 1.2.

18. The method of assembling the display device of claim 15, wherein a surface of the support member is light reflective, and the cushion layer is light transmissive.

* * * * *